United States Patent [19]

Englander

[11] Patent Number: 5,455,625
[45] Date of Patent: Oct. 3, 1995

[54] VIDEO CAMERA UNIT, PROTECTIVE ENCLOSURE AND POWER CIRCUIT FOR SAME, PARTICULARLY FOR USE IN VEHICLES

[75] Inventor: Benjamin Englander, Jamaica, N.Y.

[73] Assignee: Rosco Inc., Jamaica, N.Y.

[21] Appl. No.: 125,565

[22] Filed: Sep. 23, 1993

[51] Int. Cl.$^6$ .................................................. H04N 5/225
[52] U.S. Cl. .............................. 348/375; 348/372; 354/81
[58] Field of Search .................................... 348/207, 372, 348/373, 324, 375, 376; 358/335, 906; 354/74, 293, 81; H04N 5/225

[56] References Cited

U.S. PATENT DOCUMENTS

| | | |
|---|---|---|
| 3,535,442 | 10/1970 | Jennings . |
| 3,739,703 | 6/1973 | Behles . |
| 3,962,532 | 6/1976 | Aubert et al. . |
| 4,001,881 | 1/1977 | Folsom . |
| 4,080,629 | 3/1978 | Hammond et al. . |
| 4,283,743 | 8/1981 | Kaiser ........................ 348/373 |
| 4,394,692 | 7/1983 | Randmae et al. ................ 348/374 |
| 4,414,576 | 11/1983 | Randmae et al. ................ 348/373 |
| 4,485,407 | 11/1984 | Böhm et al. .................... 348/374 |
| 4,709,897 | 12/1987 | Mooney . |
| 4,949,186 | 8/1990 | Peterson . |
| 5,111,289 | 5/1992 | Lucas et al. . |
| 5,115,263 | 5/1992 | Bernhardt et al. . |
| 5,132,800 | 7/1992 | Wada et al. . |
| 5,189,520 | 2/1993 | Okayasu et al. . |
| 5,220,369 | 6/1993 | Sasaki . |

*Primary Examiner*—Michael T. Razavi
*Assistant Examiner*—Tuan V. Ho
*Attorney, Agent, or Firm*—Ostrolenk, Faber, Gerb & Soffen

[57] ABSTRACT

A video camera unit including an enclosure having at least one exterior channel disposed on each of two opposed exterior surfaces of the enclosure, each exterior channel receiving a mounting device, the exterior channels extending substantially the length of the enclosure in a longitudinal direction of the enclosure, the enclosure further having an interior channel extending longitudinally along each of two opposed interior surfaces of the enclosure, a mounting plate, a video camera disposed on the mounting plate, the mounting plate being slidable into the interior channels for inserting and removing the video camera into and from the enclosure, the mounting plate having electrical connections thereon for receiving electrical power for the video camera, and a front door on the enclosure which can be opened to gain access to the video camera in the enclosure, the front door having a light transmissive member therein for allowing the video camera to monitor the environment outside the enclosure. Also described is a protective enclosure for a video camera and a power and control circuit for a portable video camera.

30 Claims, 11 Drawing Sheets

VIDEO CAMERA UNIT, PROTECTIVE ENCLOSURE AND POWER CIRCUIT FOR SAME, PARTICULARLY FOR USE IN VEHICLES

BACKGROUND OF THE INVENTION

The present invention relates to video camera units and protective enclosures for video cameras, and in particular, to a video camera unit especially adapted for use in vehicles, for example, school buses. The invention also relates to a power circuit and controller circuit for portable video cameras for use in vehicles.

Video camera units have increasingly been used in vehicles, especially school buses, in order to provide surveillance of the students being transported in the school bus. By using a video camera unit in a school bus, unruly students can be supervised, and it has been found that the mere presences of a video camera unit, or even a non-functional empty enclosure or mock-up of such a unit, is effective in maintaining order on school bus vehicles.

SUMMARY OF THE INVENTION

It is, therefore, an object of the present invention to provide a video camera unit, and in particular, a video camera unit for use in vehicles, for example, school bus vehicles.

It is a further object of the present invention to provide an enclosure for a video camera for use on vehicles, and in particular school bus vehicles.

It is yet still another object of the present invention to provide a video camera enclosure which allows convenient access to the video camera mounted within the enclosure.

It is yet still a further object of the present invention to provide a video camera unit which is easy to mount within a vehicle, in particular, a school bus vehicle, and which can be adaptably mounted in a variety of angular positions within vehicles to provide adequate fields of view.

It is yet still another object of the present invention to provide a video camera unit which is sturdy, capable of withstanding abuse, lockable and theft proof.

It is yet still a further object of the present invention to provide a video camera unit which is programmable to execute a preprogrammed instruction or series of instructions upon operation of the ignition switch of the vehicle.

It is yet still another object of the present invention to provide a video camera unit which employs a timer so as to make better use of the video recording tape in the video camera (camera-recorder), so that, for example, the video camera unit is not actively taping when the school bus driver has completed the end of his run and there are no longer students on board the vehicle.

It is yet still another object of the present invention to provide a circuit which converts the vehicle power source to the proper voltage for the video camera and which also allows for the execution of a preprogrammed instruction or instructions upon turning-on the ignition switch of the vehicle, and which circuit can be conveniently mounted on the video camera in the location conventionally provided for a video camera battery pack.

It is yet still another object of the present invention to provide an enclosure for a video camera, which enclosure prevents a person from outside the enclosure determining whether a video camera is disposed within the video camera enclosure. In this way, a person cannot tell whether a camera is contained within the enclosure and will be hesitant to become unruly, even if no camera is contained within the enclosure. This means that a video camera need not be disposed in every video camera enclosure and a single camera can be moved between video camera enclosures (and thus vehicles) to be used on a random or spot check type basis, thereby reducing costs to the vehicle fleet operator.

It is also an object of the present invention to provide a video camera enclosure which allows quick and convenient removal of the video camera from the camera enclosure so that one or a limited number of video cameras can be used in a larger number of enclosures.

It is therefore also an object of the present invention to provide an enclosure for video cameras which provides the appearance of being fully functional whenever the vehicle ignition is turned on.

The above and other objects of the present invention are achieved by a video camera unit comprising an enclosure having at least one exterior channel disposed on each of two opposed exterior surfaces of the enclosure, each exterior channel receiving a mounting device, the exterior channels extending substantially the length of the enclosure in a longitudinal direction of the enclosure, the enclosure further having an interior channel extending longitudinally along each of two opposed interior surfaces of the enclosure; a mounting plate; a video camera disposed on the mounting plate, the mounting plate being slidable into the interior channels for inserting and removing the video camera into and from the enclosure, the mounting plate having electrical connections thereon for receiving electrical power for the video camera; and a front door on the enclosure which can be opened to gain access to the video camera in the enclosure, the front door having a light transmissive member therein for allowing the video camera to monitor the environment outside the enclosure.

The above and other objects of the present invention are also achieved by a protective enclosure for a video camera comprising an enclosure having at least one exterior channel disposed on each of two opposed exterior surfaces of the enclosure, each exterior channel receiving a mounting device, the exterior channels extending substantially the length of the enclosure in a longitudinal direction of the enclosure, the enclosure further having an interior channel extending longitudinally along each of two opposed interior surfaces of the enclosure; a mounting plate; a video camera disposed on the mounting plate, the mounting plate being slidable into the interior channels for inserting and removing the video camera, the mounting plate having electrical connections thereon for receiving electrical power for the video camera; and a front door on the enclosure which can be opened to gain access to the interior of the enclosure, the front door having a light transmissive member mounted therein.

The above and other objects of the present invention are also achieved by a power circuit for a portable video camera to be mounted in a vehicle, comprising a voltage conversion circuit for converting a voltage from a vehicle power source to a voltage required by the video camera, the voltage conversion circuit being disposed on a circuit board provided in a housing, the housing being adapted to mount removably to the video camera in a position conventionally provided for disposition of a battery pack for the video camera, the circuit board having contact means thereon for engaging with electrical connections provided on the video camera for normally engaging with electrical connections of the battery pack.

The above and other objects of the present invention are further achieved by a protective enclosure for a video camera to be mounted in a vehicle comprising an enclosure adapted to mount to the vehicle, the enclosure having two interior channels, each interior channel extending longitudinally along a respective one of two opposed surfaces of the enclosure, a mounting plate adapted to receive a video camera thereon, the mounting plate being slidable into the interior channels for inserting and removing the video camera, the mounting plate having electrical connections thereon for receiving electrical power from the vehicle for the video camera, and a front door on the enclosure which can be opened to gain access to the interior of the enclosure, the front door having a light transmissive member mounted therein.

BRIEF DESCRIPTION OF THE DRAWINGS

The invention will now be described in greater detail in the following detailed description with reference to the drawings in which.

DETAILED DESCRIPTION OF THE INVENTION

Figure 1:
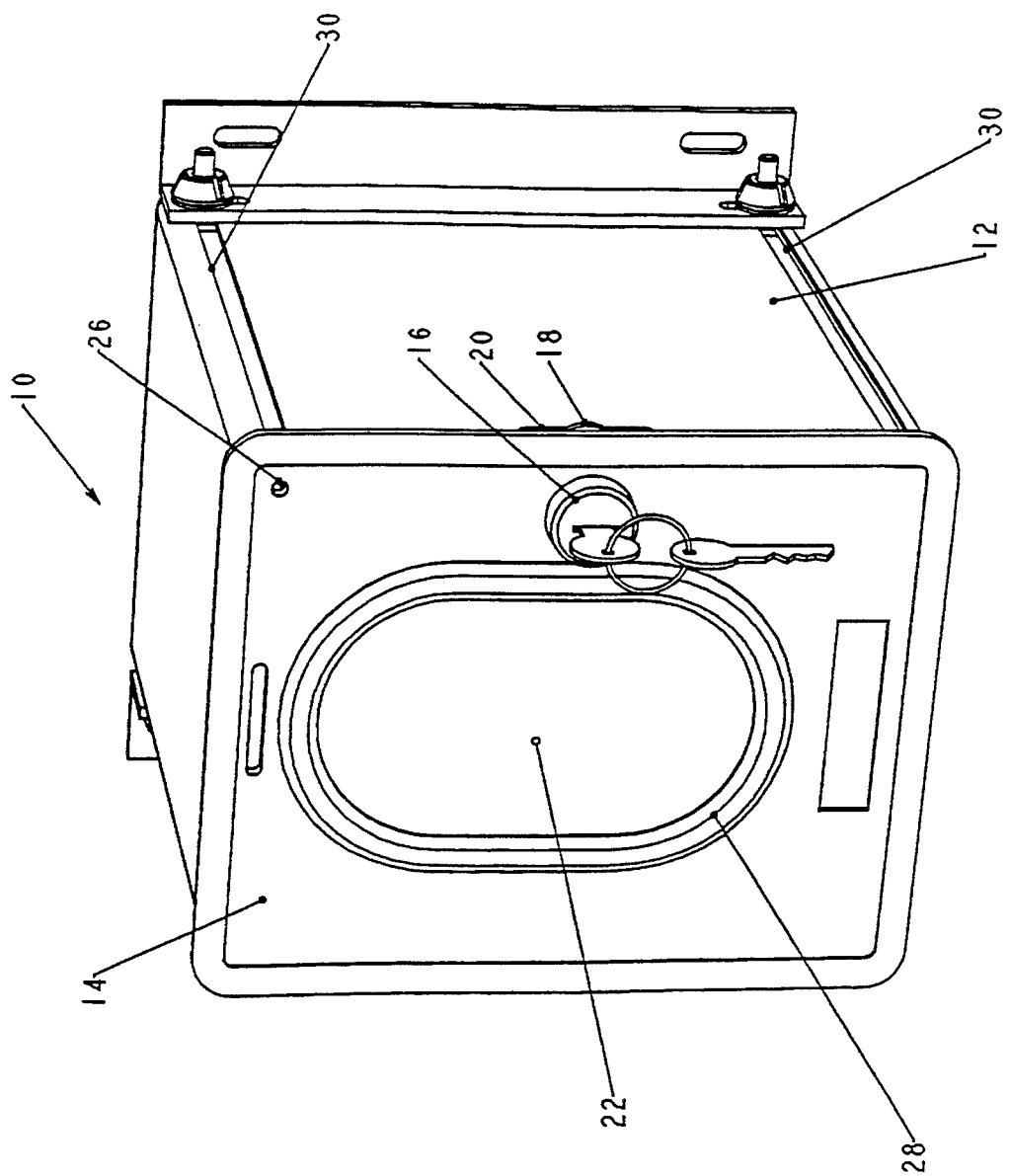
FIG. 1 shows a perspective view of the video camera unit according to the present invention showing the video camera enclosure having its front door in a closed locked position.
Figure 1A:
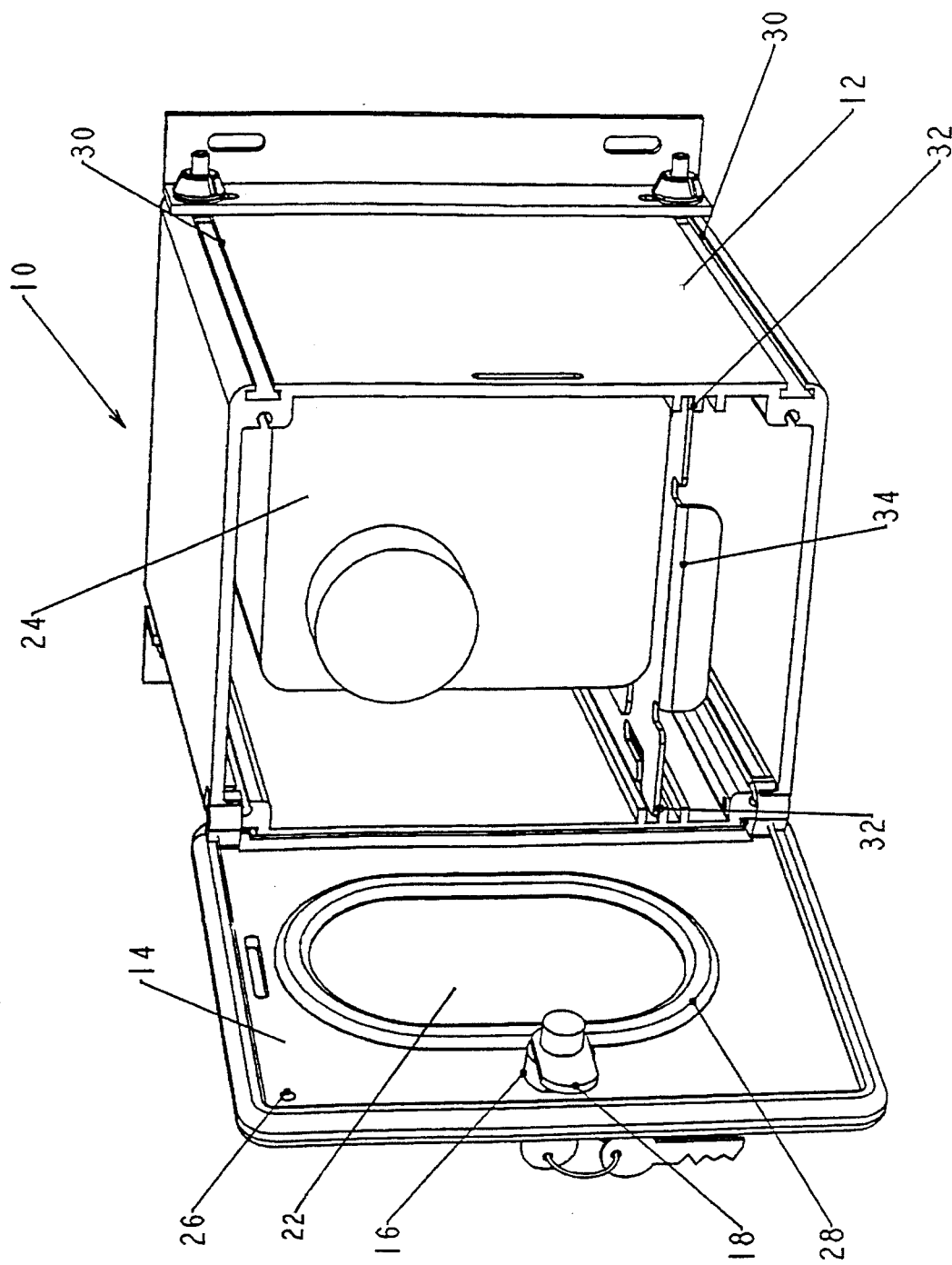
FIG. 1A is a perspective view of the video camera unit showing the video camera enclosure door opened with the video camera (schematically shown) visible therein.

With reference now to drawings, FIG. 1 shows in perspective view the video camera unit according to the present invention. FIG. 1A shows the video camera unit with its front door open, exposing the video camera contained therein. The video camera may be a camera-recorder, popularly known as a camcorder. The video camera unit includes an enclosure generally denoted by reference numeral 10. The enclosure preferably comprises an extruded aluminum rectangular box 12 sized to receive a video camera and a hinged door 14 attached to the front of the box 12. The enclosure, shown rectangular in cross section in the drawings, could also have another shape, e.g., round or oval. The rear of the box 12 is provided with a backing plate (not shown) mounted to the box 12 by any suitable means. The door 14 includes a key lock 16 having a locking lever 18 engaged in a slot 20 in the box 12. Other known locking devices can also be used. The door 14 includes a one way light transmissive member 22, which allows the video camera 24 contained within the enclosure to view its environment, but which does not allow an individual from outside the enclosure to see into the enclosure. For example, the light transmissive member 22 may be a piece of hardened glass or plastic, coated with a suitable reflective surface which prevents an individual from looking into the device but which allows the camera inside to monitor the environment outside. The reason for providing this one-way light transmissive member is so that a person cannot determine if there is or is not a camera mounted in the enclosure. It has been found that if a person believes that he is under surveillance by a video camera, unruly behavior will be prevented. Thus, the enclosure may not even contain a camera, but as long as those inside the vehicle believe they are being monitored or taped, they will maintain appropriate behavior.

The door 14 also includes a light-emitting diode 26 suitably mounted in the door or in a bore in the box 12. The light-emitting diode 26 is energized whenever power to the video camera unit is applied, even if no camera is contained within the enclosure. Again, the reason for this is to give the impression that the video camera unit is monitoring and/or recording its environment, thereby maintaining order within the vehicle.

The door 14 includes a suitable soft gasket 28 around the one way light transmissive member to cushion the one-way light transmissive member 22 and also optionally to cushion the door against video camera 24.

As described, the box 12 preferably is an extruded aluminum member and has a series of T-shaped exterior channels 30 provided along two vertical sides at the four corners.

The box 12 can be made in other ways and of other materials, e.g., molded plastic or of another metal, by extrusion or other process, as known to those of skill in the art. It should be made as sturdy, theft-proof, damage resistant and resistant to opening, tampering and abuse as possible. The channels 30 provide means for adjustably and adaptably mounting the video camera unit in a vehicle, as will be described below. In addition to T-shaped exterior channels 30, additional interior channels 32 preferably are formed during the extrusion process. Channels 32 are provided to hold a video camera mounting plate 34 in position in the interior of the enclosure. This will described in further detail below.

Although the embodiment described shows interior channels 32 disposed on vertical interior walls of the box 12, so that plate 34 is disposed horizontally, channels 32 could also be disposed on the top and bottom interior walls of box 12, so that plate 34 would be disposed in a vertical plane.

Additionally, although exterior channels 30 are disposed on the exterior vertical walls of box 12, they could also be disposed in the longitudinal direction on the top and bottom exterior walls 12. This would be useful especially where a left or right directed camera viewing angle was desirable, as will be apparent below.

Figure 2:
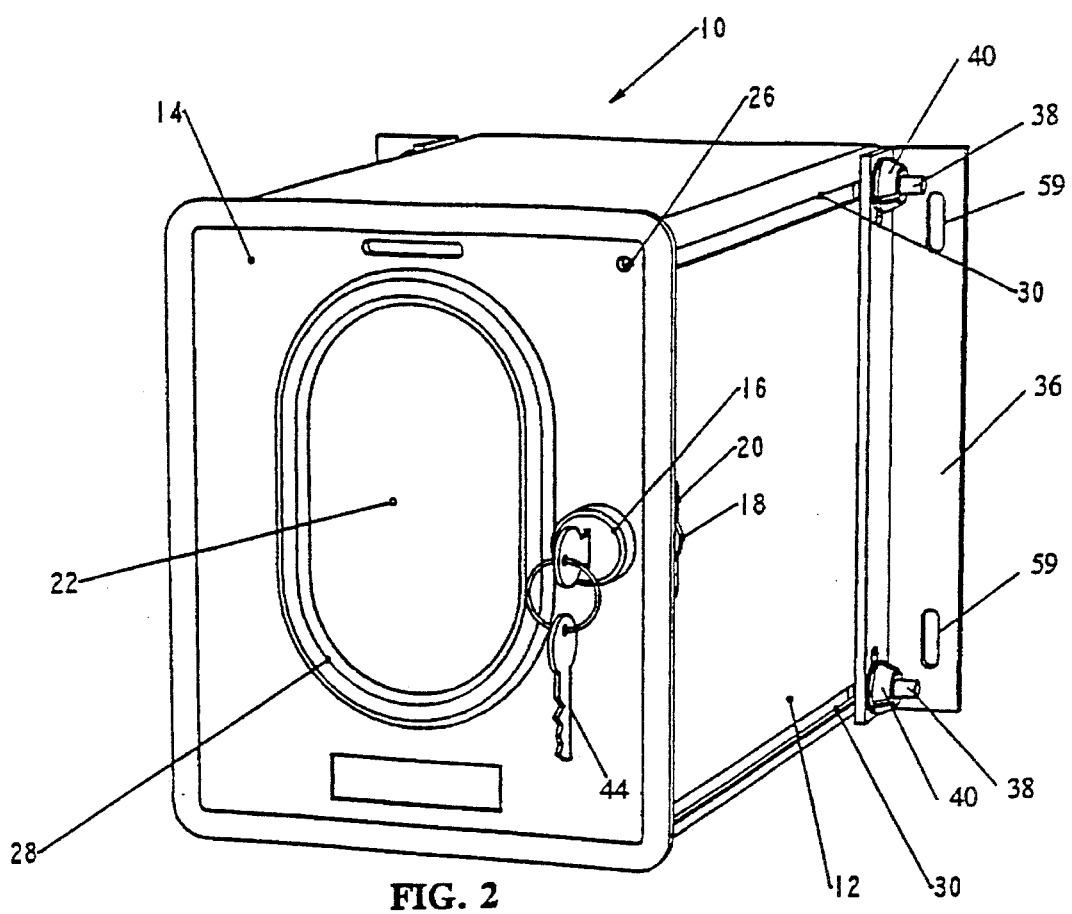
FIG. 2 shows a perspective view of the video camera unit with the video camera door closed, and showing mounting hardware attached to channels in the video camera enclosure for mounting the video camera unit in a vehicle.
Figure 2A:
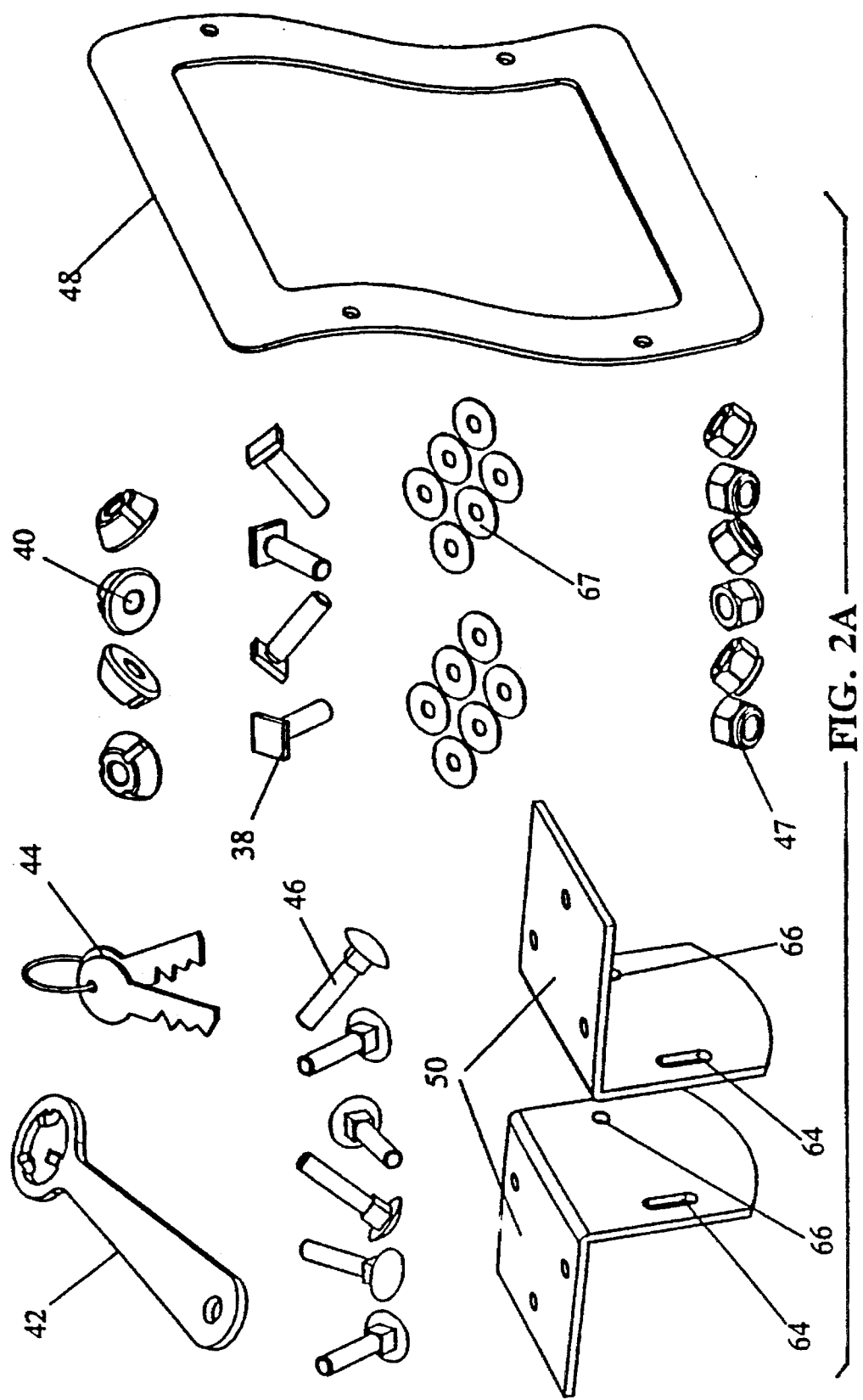
FIG. 2A shows certain of the hardware components utilized in mounting the video camera unit in a vehicle.

FIG. 2 shows the video camera unit 10 having one embodiment of mounting hardware comprising mounting brackets 36 attached thereto. A kit of parts, shown in FIG. 2A, is provided with the video camera unit. The kit of parts includes preferably squared headed screws 38 which are received in the channels 30 in the box 12. These square headed screws 38 are slid into the T-shaped channel 30 from either the back of the unit or from the front of the unit when the door 14 is opened. As shown, the channels 30 are shaped so that square head screws 38 are prevented from being pulled out of the channels but can freely slide to any position in the channels. When tightened, the screws 38 cannot be moved. They are preferably provided with square heads slightly smaller than the wide inner part of the T-shaped channel 30 so that they will slide freely but will not turn when being tightened.

Preferably, anti-theft headed nuts 40 are provided such as Tri-Groove nuts, to prevent unauthorized removal of the video camera unit. A Tri-Groove type wrench 42 is preferably provided with the kit of parts to facilitate installation. Other anti-theft designs can be used. Also enclosed with the kit of parts are keys 44 for locking and unlocking the door 14, carriage bolts 46 and washers and nuts 47 for mounting brackets 36 to the vehicle, gasket 48 for insulating the video camera unit from the vehicle and sealing a hole optionally cut in the vehicle when mounting the video camera unit and additional brackets 50 for providing an alternative means of securing the video camera unit when the video camera unit cannot be installed within a recess cut into the vehicle body.

Figure 3:
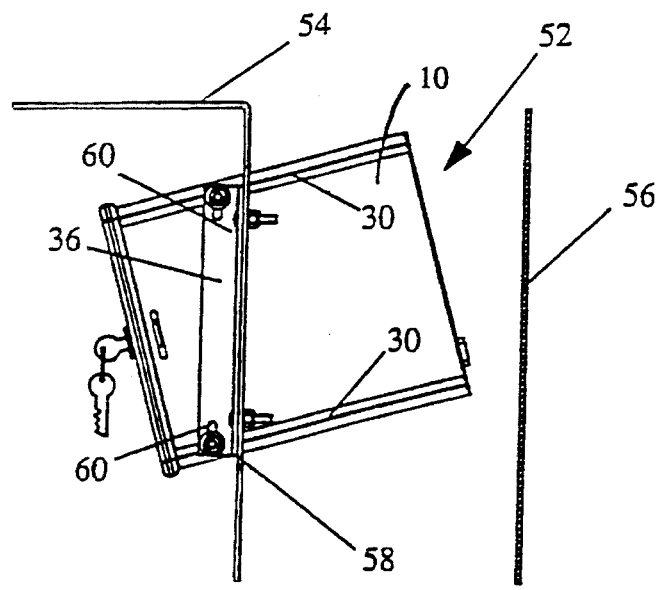
FIG. 3 shows the video camera unit according to the invention with the mounting hardware shown in FIG. 2 mounted into an opening provided in the header area of a vehicle.

FIG. 3 shows one method of mounting the video camera unit 10 to a vehicle. In FIG. 3, space 52 represents an open space between the header portion 54 (above the windshield) of the vehicle and the outside body portion 56 of the vehicle. Assuming there is sufficient space between the members 54 and 56, an aperture 58 may be cut into the vehicle header portion 54. The brackets 36 are fastened to the video camera unit enclosure box 12 to achieve the required angle of inclination of the video camera unit through elongated holes 60 using the square headed screws 38 and the anti-theft nuts 40 as shown in FIG. 2. The gasket 48 is preferably disposed around the video camera unit 10 behind the brackets 38, and the unit is then inserted partially into the aperture 58.

Carriage bolts 46 and hardware 47 are then utilized to mount the brackets 36 to the vehicle header through elongated holes 59 and bolt holes drilled into the header 54. A template can be provided to make the necessary hole 58 and screw holes for recessed mounting of the unit.

The brackets 36 include elongated holes 60 disposed therein through which the square headed screws 38 extend. Elongated holes 60 are provided so that the camera unit 10 can be disposed at the necessary angle of inclination, as shown in FIG. 3, to provide the proper field of view for the video camera. The channels 30, which run the full length of box 12, in conjunction with brackets 36, thus provide a means for adaptably and adjustable mounting the video camera unit over a range of angular positions.

Figure 4:
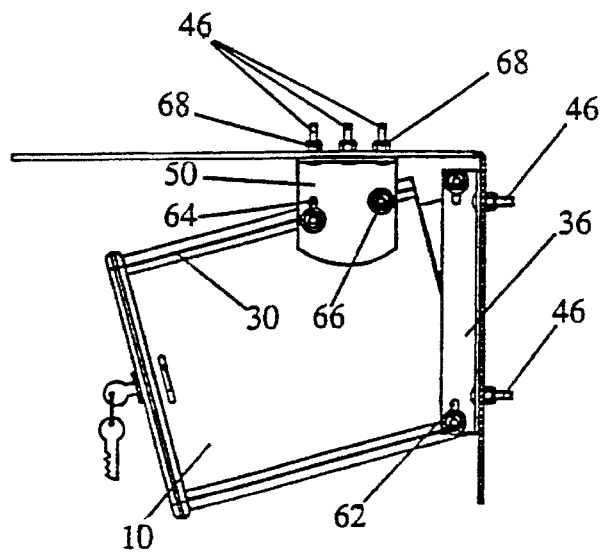
FIG. 4 shows an alternative mounting of the video camera unit according to the present invention utilizing the mounting brackets shown in FIG. 2 and certain additional brackets shown also in FIG. 2A.

FIG. 4 shows an alternative embodiment for mounting video camera unit 10. FIG. 4 is used where the video camera unit cannot be mounted within a recess in the header, as shown in FIG. 3. For example, FIG. 4 would be used where the space 52 behind the header is insufficient for allowing recessed mounting of the video camera unit. In such a circumstance, the brackets 36 are utilized to provide a partial mount of the video camera unit 10 to the vehicle. The carriage bolts 46 mount the brackets 36 to the vehicle through holes 59 (FIG. 2) as shown in FIG. 4. However, the video camera unit is only mounted at the lower channel 30 through the lower elongated hole 60 of the bracket 36, as shown at 62 in FIG. 4. This is accomplished by using the square headed screws 38 in the channels 30 and the anti-theft nuts 40. To mount the video camera securely, the two brackets 50 shown in FIG. 2A are utilized. Brackets 50 each include an elongated hole 64 and a hole 66. The elongated holes 64 allows the video camera unit to be mounted at the desired angle of inclination, as shown in FIG. 4. Two of the square headed screws 38 are provided through the holes 64 and 66 as shown in FIG. 4 to allow angled mounting of the video camera unit. The carriage bolts 46 and nuts and washers 47 are used to mount the brackets 50 to the roof of the vehicle, as shown at 68.

Figure 5:
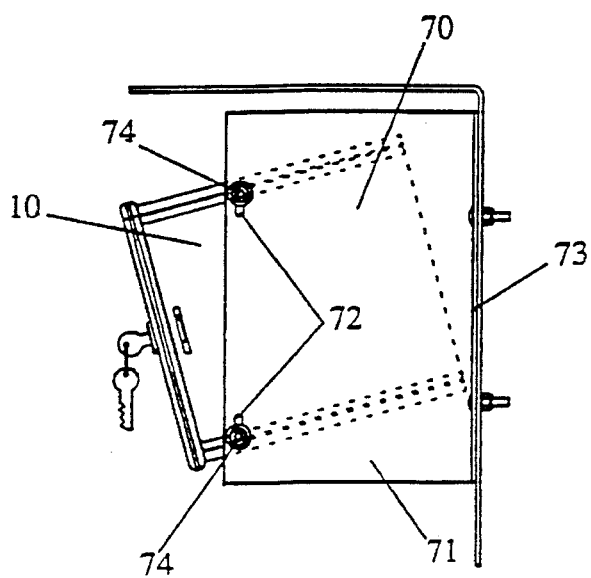
FIG. 5 shows a third mounting arrangement according to the present invention utilizing a different form of mounting bracket.

FIG. 5 shows another alternative means of mounting the video camera unit 10 to a vehicle. In the mounting embodiment shown in FIG. 5, wide brackets 70 are provided. These brackets are similar to brackets 36 in that they are angle-type brackets. However, one leg 71 of the brackets 70 is much wider than the leg 73 which mounts to the vehicle. The wider leg 71 has elongated mounting holes 72 disposed therein which allows for angled mounting of the video camera unit 10 from the horizontal via screws 38 and nuts 40 as shown at 74.

In addition to adjustable angularly mounting the video camera unit at an angle of inclination from the horizontal, the mounting of the video camera unit described with respect to the above mounting embodiments also allows a small amount of angular range in the plane in which the video camera unit is inclined. For example, by varying the location in channels 30 from one side to the other side at which the screws 38 are tightened, the angular viewing position, i.e., toward the left or right side of the vehicle, can be adjusted. If necessary, wedge-shaped shims can be provided around screws 38 to maintain a particular left or right directed angular orientation.

Figure 6:
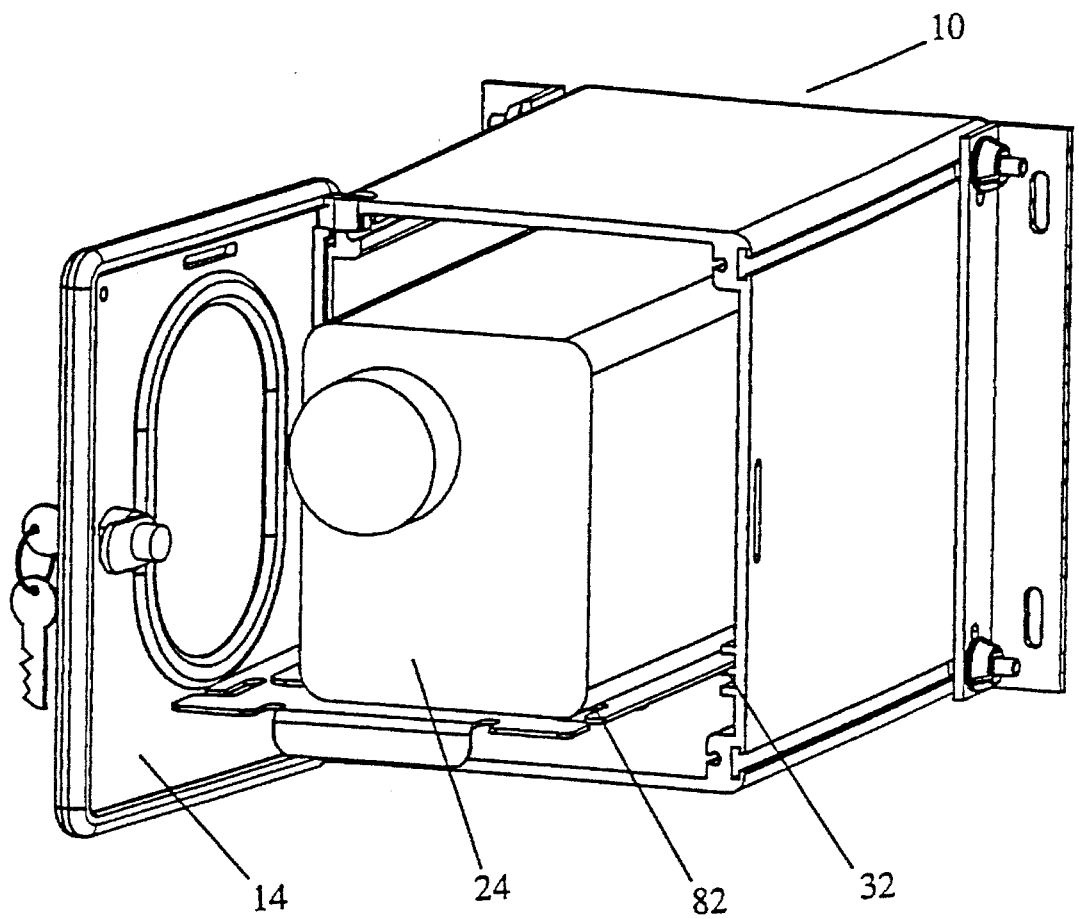
FIG. 6 shows the video camera unit according to the present invention with the front door opened and with the camera unit partially extended from the video camera enclosure.
Figure 9A:
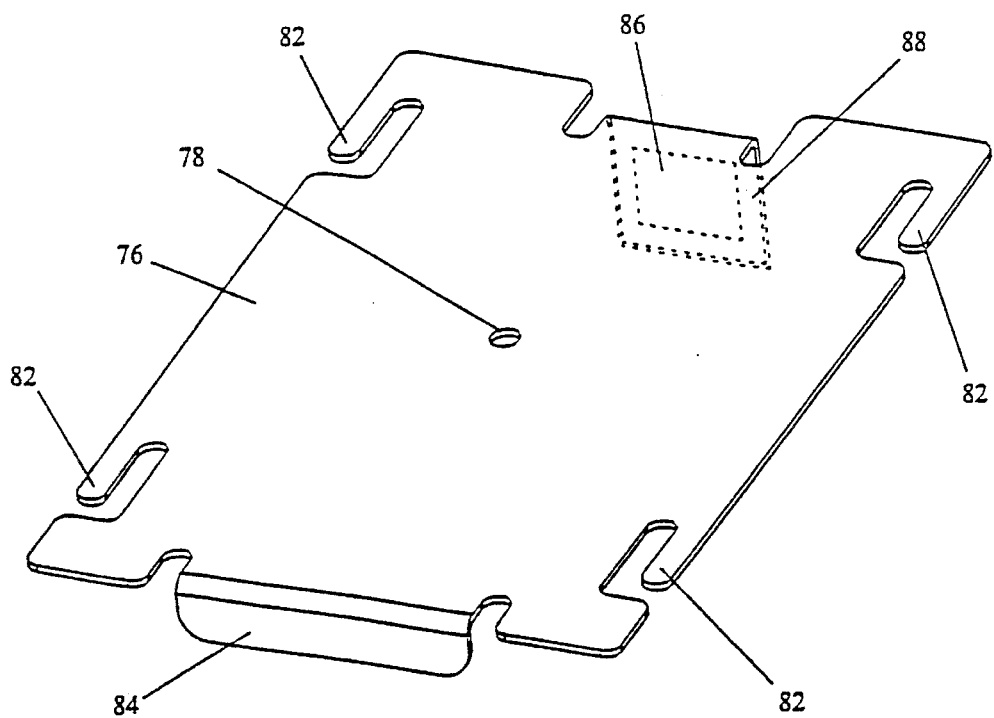
FIG. 9A shows the video camera unit holding plate which is slidably inserted into the video camera enclosure.

FIG. 6 shows the video camera unit 10 with the front door 14 opened exposing the video camera 24 (schematically shown) disposed on a video camera mounting plate 76, shown in perspective view in FIG. 9A. The video camera mounting plate 76 includes an aperture 78 therein for mounting the video camera 24 to the video camera tripod screw hole conventionally found on video cameras. A suitable screw 80 (FIG. 9B) is provided for mounting the video camera to the video camera mounting plate 76. The video camera mounting plate preferably includes four fingers 82 provided at each of the corners. These fingers are cut or formed or stamped in the video camera mounting plate 76 and bent slightly downward (or upward) out of the plane of the plate 76. When the video camera mounting plate having the video camera disposed thereon is slid into the channels 32 in the enclosure box 12, as shown in FIG. 6, the fingers 82, because they are bent out of the plane of the plate 76, securely hold the video camera mounting plate with video camera attached thereon in the channels 32, thereby preventing movement of the video camera with respect to its enclosure 12. This helps to prevent damage to the video camera, particularly since it is to be used in vehicles, which are subject to jarring movements and vibration. The plate 76 is preferably made of hard steel, so as to retain the springiness of the fingers 82 over constant and repeated insertions of the plate 76, for the lifetime of the unit 10. Other arrangements can be used to minimize such movement or vibration, as known to those of skill in the art. For example, spring members can be used, either integral or separate (attached or unattached) to plate 76.

Figure 9B:
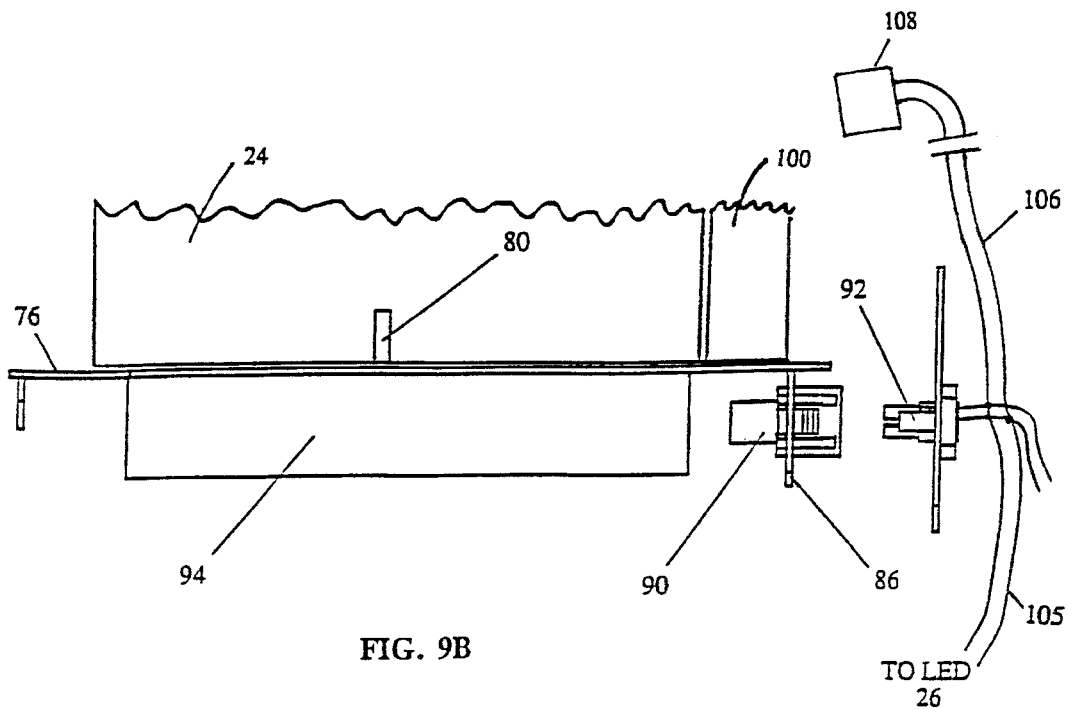
FIG. 9B is a side view of the video camera holding plate of FIG. 9A showing the video camera and printed circuit board mounted thereon, and also showing the timer unit mounted under the video camera holding plate and the connections of the printed circuit board and timer to the power input jack located on the video camera holding plate.

The video camera mounting plate 76 includes a flange 84 at its front end for allowing grasping of the mounting plate to remove the video camera from the enclosure. At its rear, the video camera mounting plate 76 includes another flange 86 which includes an aperture 88, through which an electrical jack 90 for providing power to the video camera is disposed. FIG. 9B schematically shows details of the mounting of jack 90. The back of the video camera enclosure includes an electrical plug 92 which is connected to vehicle power via the vehicle ignition switch. When the vehicle ignition switch is turned on, vehicle power is supplied to the plug 92. When the video camera mounting plate is inserted into the enclosure 12 by sliding the plate into the channels 32, the plug 92 is received within the jack 90, thereby providing power, when the ignition switch is on, to the video camera. As will be evident to those of skill in the art, jack 90 and plug 92 can be reversed, so that the plug is on plate 76 and the jack is mounted on the back of enclosure 12. When the vehicle ignition is on, power is first supplied through a timer circuit 94 to voltage conversion circuit 96, shown in more detail in FIG. 10.

Figure 7A:
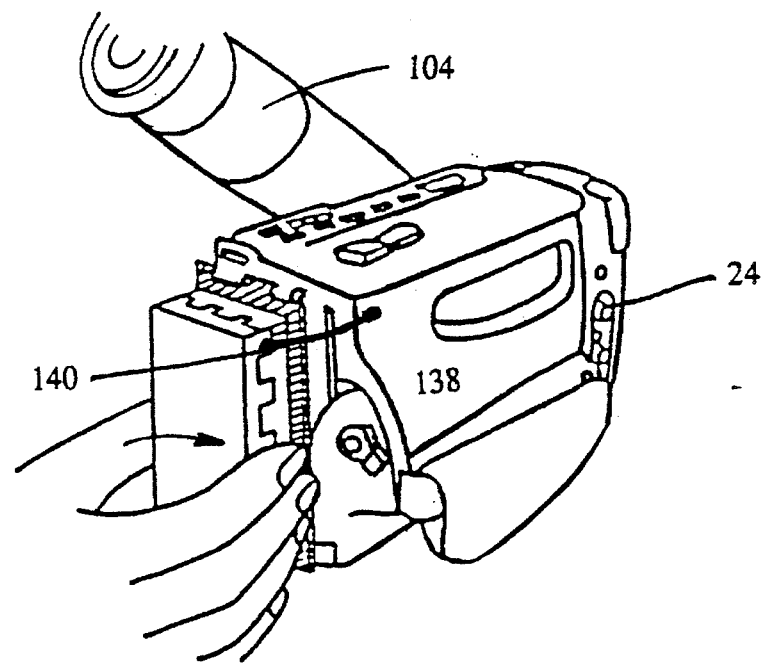
FIG. 7A shows mounting of a printed circuit board containing voltage conversion circuitry and the controller circuitry for the video camera, and in particular, shows the method of mounting the printed circuit board in the position normally occupied by a conventional battery pack for video cameras.
Figure 8:
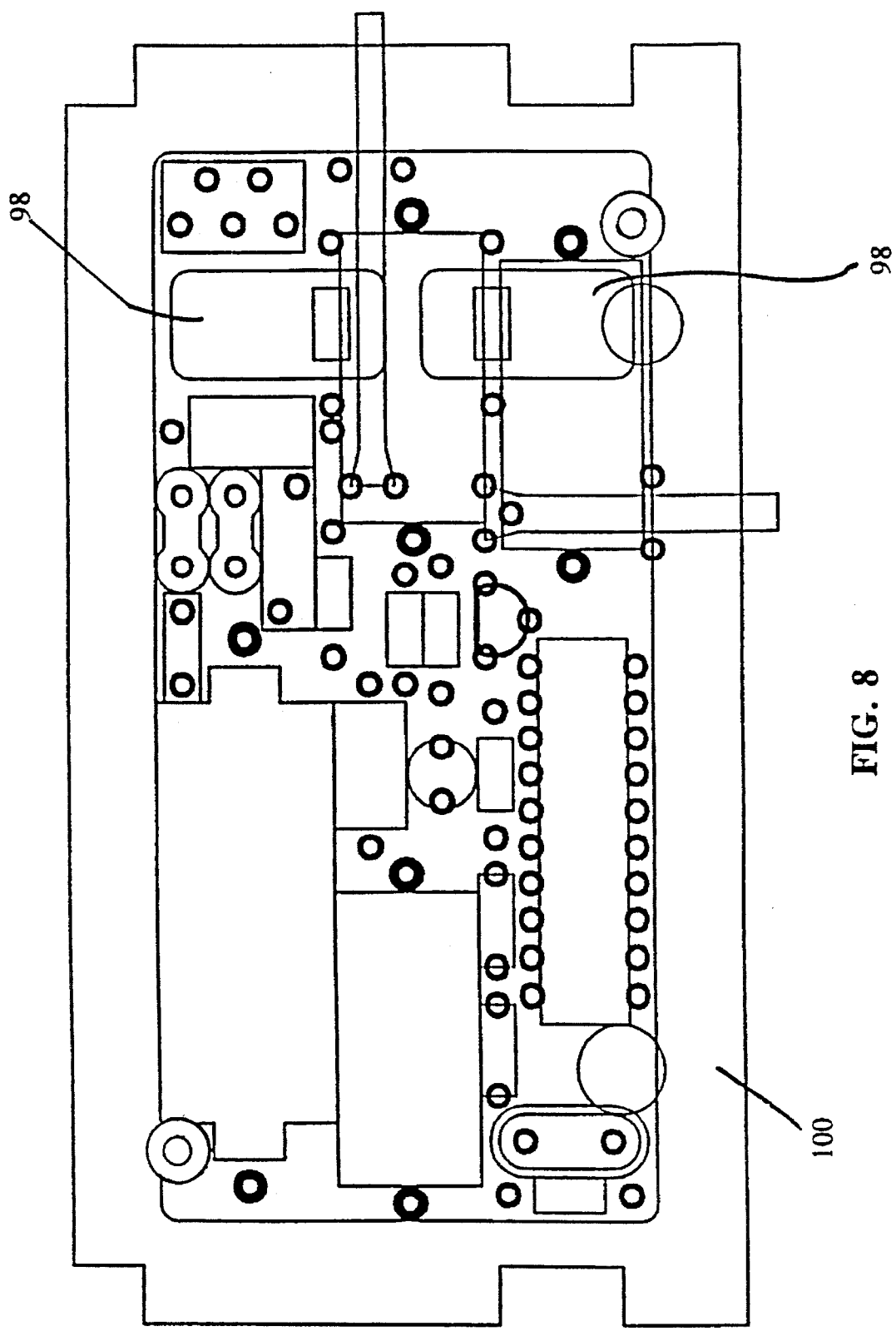
FIG. 8 shows details of the printed circuit board and in particular, shows the printed circuit board connections which make contact with the conventionally provided battery pack connections on a video camera.

Before describing the timer circuit and the voltage conversion circuitry, reference should be had to the printed circuit board on which the voltage conversion circuitry as well as the controller circuit of FIG. 11 (described below) are contained, as shown in detail in FIG. 8. The printed circuit board shown in FIG. 8 includes two contacts 98 formed on the printed circuit board which releasably engage with projecting contacts disposed on the back of the video camera. These projecting contacts on the back of the video camera are conventionally provided to engage the battery contacts of a conventional battery pack which is used to power the video camera. In the present invention, a battery pack is unnecessary because the video camera unit is powered by the vehicle's electric power source. Accordingly, the battery pack on the video camera unit is unnecessary. Instead of mounting a battery pack at this location on the video camera, the printed circuit board 100, suitably enclosed in a housing, is mounted in place of the battery, in the same way that the battery is mounted. Accordingly, the contacts 98 are made and sized in substantially the same way as the contacts of such battery packs. The printed circuit board is put into a position in conventional fashion where the battery pack is mounted, as shown in FIG. 7A, and once this is accomplished, the contacts 98 of the printed circuit board engage with the projecting contacts of the video camera, thus providing power to the video camera. The contacts 98 on the printed circuit board 100 shown in FIG. 8 are connected to the points 98A of the voltage conversion circuitry 96, to be explained in further detail below.

Figure 7B:
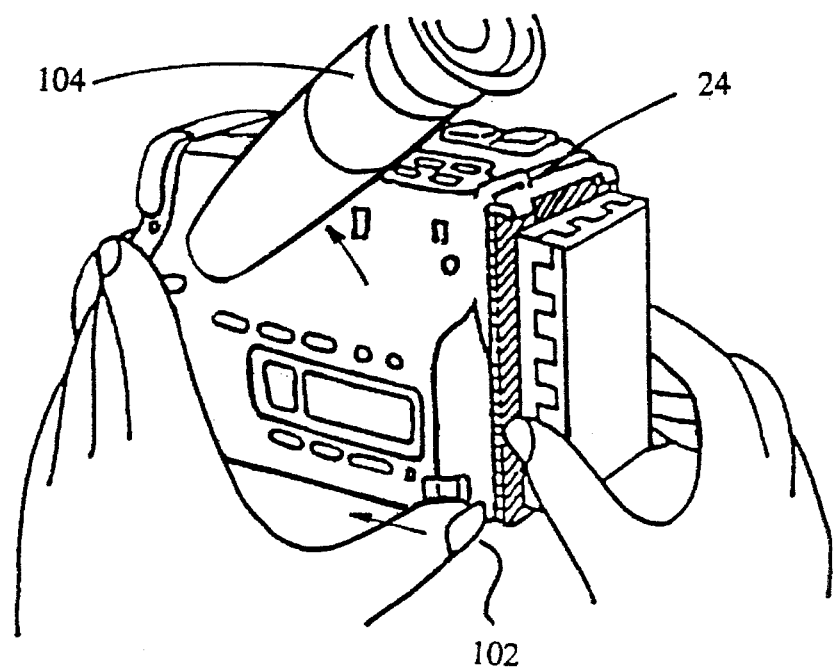
FIG. 7B shows how the printed circuit board of FIG. 7A can be removed from the video camera.

In order to remove the printed circuit board, as shown in FIG. 7B, a lever 102 disposed on the camera is depressed, and the printed circuit board is slid out of its position on the video camera.

In FIG. 7A and 7B, a Sony model TR71 or TR61 camera-recorder is shown. In this camera-recorder, a movable view finder 104 is provided. In order to place the printed circuit board housing on the camera, the viewfinder 104 must be moved out of position. When the camera is disposed in the housing 12, the viewfinder is folded back into its compact position adjacent the camera.

Another video camera which can be used is the Panasonic model PV22. Other video cameras made by other manufacturers can also be used.

As shown in FIG. 9B, the vehicle electric power source is coupled to plug 92. In addition to being coupled to plug 92, preferably an extension cord 106 is provided which is connected in parallel to the vehicle power source. Extension cord 106 includes a plug 108 identical to plug 92. The extension cord 106 and plug 108 are coiled at the back of the enclosure 12. In this way, once the video camera is removed from the enclosure 12, it can be connected to the extension cord 106 via the plug 108, which can be extended out of the enclosure. This is convenient, for example, during the initial turn-on of the unit to ensure correct operation, or for servicing the unit, so that the video camera can be operated outside of the enclosure 12.

Also shown in FIG. 9B are connections 105 to light-emitting diode (LED) 26 mounted on the front door 14. As discussed, LED 26 is illuminated whenever vehicle power to the video camera unit 10 is on, even if no camera 24 is mounted in the enclosure, thereby to give the appearance that the unit 10 is fully functional.

Figure 10:
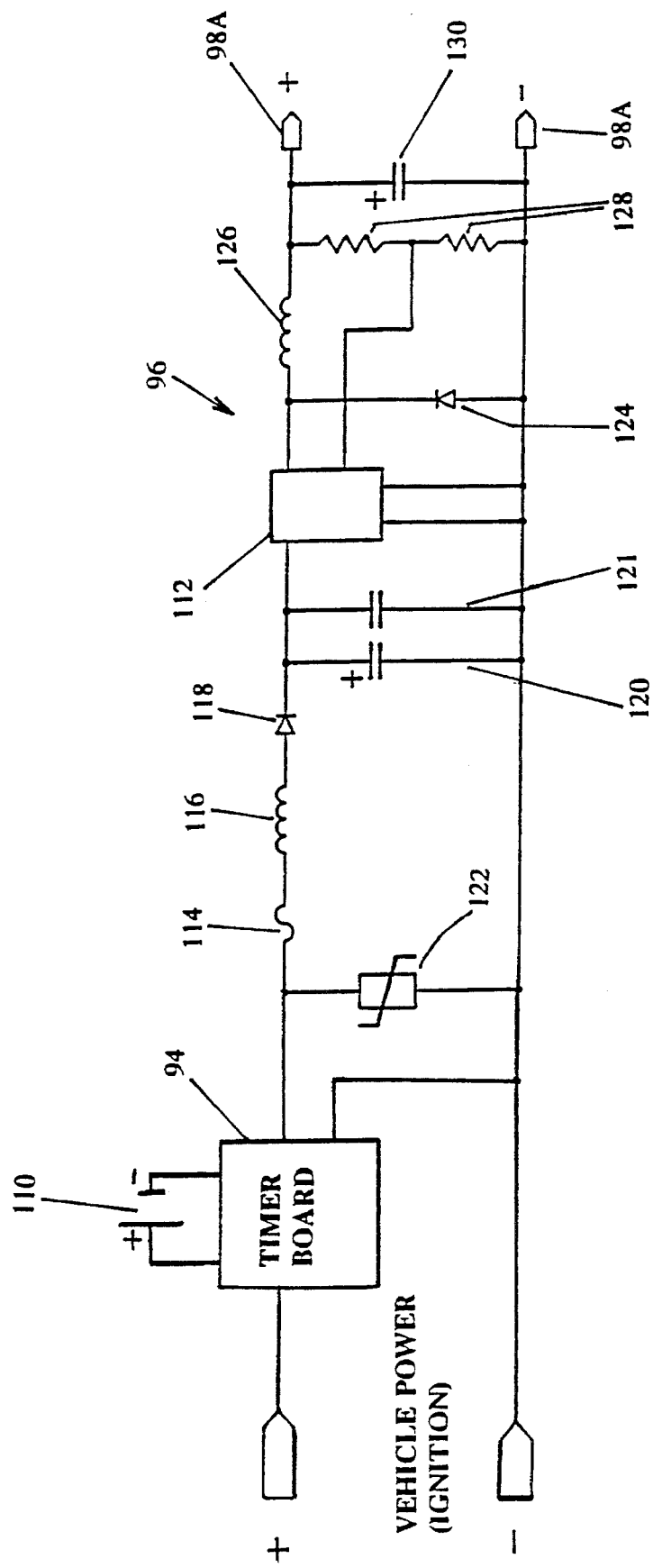
FIG. 10 shows the voltage conversion circuitry for converting vehicle power from the vehicle ignition switch to the voltage level required by the video camera, and also showing the connection of the timer to the voltage conversion circuitry.

FIG. 10 shows details of the voltage conversion circuitry and the timer circuit 94. The timer circuit 94, shown in its physical location below plate 76 in FIG. 9B, is mounted in series, preferably with the positive voltage terminal from the vehicle ignition power source. The timer 94 includes its own battery 110, preferably a rechargeable NICAD battery which is charged from the vehicle power source whenever vehicle power is present at plug 92 and the mounting plate jack 90 is engaging it. The timer must have its own power source because the timer must be synchronized to the actual time at all times in order to turn-on the video camera at the appropriate time for taping.

The voltage conversion circuitry 96 includes a voltage regulator 112 as well known to those of skill in the art which converts the input voltage of the vehicle power source to the voltage required by the video camera, for example, five to eight volts. The voltage conversion circuitry also includes a fuse 114, input choke 116, diode 118, filter capacitors 120 and 121, voltage suppression varactor 122 and diode 124, output choke 126, and voltage divider resistors 128 of the proper resistance ratio to provide the appropriate output voltage at the terminals 98A. An output filter capacitor 130 is also provided, as known to those of skill in the art. Other equivalent voltage conversion circuits can also be used.

Figure 11:
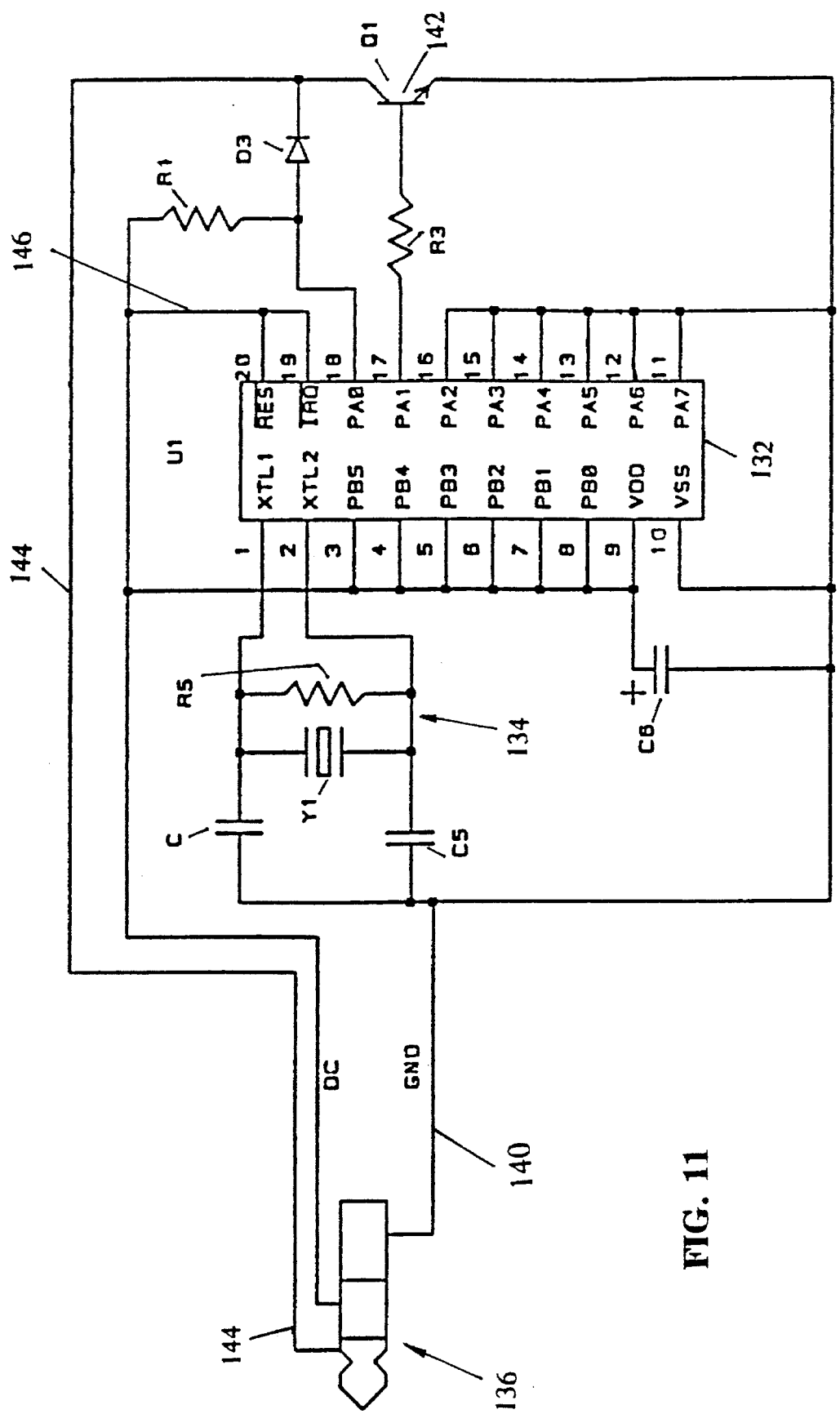
FIG. 11 shows the controller circuitry for storing at least one pre-programmed instruction which is executable by the video camera upon receipt thereof after receiving power from the vehicle power source.

Also present on circuit board 100 shown in FIG. 8 is a controller circuit, shown in FIG. 11. The purpose of this circuit is to cause the video camera to begin recording once power is applied when the timer is in its "on" period. Other instructions can also be provided to the video camera from this circuit. The controller circuit includes a suitable processor 132 with appropriate instructions programmed therein. The processor may be a Motorola type MC68HC705J2P. The circuit shown in FIG. 11 includes suitable clock circuitry 134. The circuit of FIG. 11 is powered via a suitable plug 136 from the video camera. This plug 136 is preferably inserted into the "remote jack" 138 conventionally provided on the video camera (see FIG. 7A). A line 140 connects the video camera via the remote jack 138 and plug 136 to the printed circuit board circuitry of FIG. 11. An output port of the processor 132 is connected to a suitable switching device, for example, a transistor 142, which provides instructions to the video camera 24 via line 144. Although the processor circuitry of FIG. 11 is shown powered through the camera 24 via remote jack 138, it could also be powered directly from the output of the voltage conversion circuitry, i.e., terminals 98A.

The controller circuitry of FIG. 11 operates in the following manner. When the ignition of the vehicle is turned on, power is provided to the printed circuit board if the timer 94 is in its "on" period so that it supplies power to the board 100. Assuming the timer is in its "on" period, the camera 24 will then have power applied, although it will not begin taping without an instruction to do so. Power will also be provided to the circuit of FIG. 11 via the remote jack 138 of the camera 124 and the lines DC and ground of cable 140. Processor 132 will then be reset by the reset line 146, and the instruction or series of instructions stored therein will be provided to transistor 142 for transmission along output line 144 to the video camera 24. The video camera is then instructed to begin taping and/or any other appropriate instructions can be given. For example, the video camera can be instructed to apply a date and time stamp to the tape recording, or to begin recording after a time delay.

The timer 94 provides the advantage of not wasting recording tape. For example, it is unnecessary to record before the driver begins his route or after the bus driver has completed his route. Accordingly, the timer can be programmed to come on somewhat in advance of the time when the driver would be expected to begin his route, so that recording occurs when the bus is being used, and programmed to go off some time shortly after the driver would be expected to finish his route. Later on in the day when the bus driver begins another route, the timer can be instructed to go on and thereafter off when the bus driver is expected, respectively, to begin and end the route. In this way valuable taping time is not wasted when the bus is empty but the ignition is on. Each time that the timer turns on, thus supplying power to the camera, the processor 132 of the circuit of FIG. 11 is also turned on and reset, thereby transmitting the preprogrammed instructions to the video camera. In this way, each time that the timer turns on, the video camera begins to record the environment within its view.

Also, each time the vehicle ignition is turned on, provided the timer is in its "on" period, the processor 132 is reset and instructions are issued to the video camera 24 to begin taping and performing any other functions for which instructions are given.

A suitable timer for use as timer 94 may be a model TH 817-1-S, available from Frontier Technology Co., Ltd., of Taipei, Taiwan. The timer circuit 94 can also be provided integrally on circuit board 100, if desired.

When the vehicle ignition is turned off, power is removed from the plug 92, thereby removing power from the video camera. However, as explained above, the timer must have an uninterrupted power source, and is provided with a rechargeable battery 110 which is charged whenever power is applied to the plug 92.

Although the present invention has been described in relation to particular embodiments thereof, many other variations and modifications and other uses will become apparent to those skilled in the art. therefore, the present invention should be limited not by the specific disclosure herein, but only by the appended claims.

What is claimed is:

1. A protective enclosure for a video camera comprising:

an enclosure having at least one exterior channel disposed on each of two opposed exterior surfaces of the enclosure, each exterior channel receiving a mounting device, the exterior channels extending along the length of the enclosure in a longitudinal direction of the enclosure, the enclosure further having an interior channel extending longitudinally along each of two opposed interior surfaces of the enclosure;

a mounting plate adapted to receive a video camera thereon, the mounting plate being slidable into the interior channels for inserting and removing the video camera into and from the enclosure, the mounting plate having electrical connections thereon for receiving electrical power for the video camera;

a front door on the enclosure which can be opened to gain access to the interior of the enclosure, the front door having a light transmissive member mounted therein;

the exterior channels have a T-shape with the leg of the T-shape extending outwardly, the exterior channels being adapted to receive said mounting device, the mounting device comprising a screw, the head of the screw being slidably received in the exterior channel, whereby the screws can slide substantially the full length of the exterior channels without being able to be pulled out of the exterior channels; and the protective enclosure further comprising two angle-shaped mounting brackets having holes therein adapted to be fastened to screws in the exterior channels for mounting of the protective enclosure to a surface at an adjustable angle of inclination.

2. The protective enclosure recited in claim 1, wherein the enclosure comprises an extruded member, with said exterior and interior channels formed during an extrusion process.

3. The protective enclosure recited in claim 1, wherein the enclosure is rectangular in cross-section, the exterior channels being disposed in vertical exterior sides of the enclosure, two such exterior channels being provided on each vertical exterior side, one exterior channel being disposed adjacent a top corner and one exterior channel being disposed adjacent a bottom corner of the enclosure.

4. The protective enclosure recited in claim 1, wherein the enclosure is mounted in a recess in a surface.

5. The protective enclosure recited in claim 1, wherein the angle-shaped brackets each have one leg wider than the other leg, with the wider leg having holes receiving the screws mounted in the exterior channels, the other leg being mounted to the surface.

6. The protective enclosure recited in claim 5, wherein the holes in the angle-shaped mounting brackets are elongated to allow rotation of the enclosure with respect to the brackets thereby to enable angular mounting of the protective enclosure.

7. The protective enclosure recited in claim 1, wherein the holes in the angle-shaped mounting brackets are elongated to allow rotation of the enclosure with respect to the brackets thereby to enable angular mounting of the protective enclosure.

8. The protective enclosure recited in claim 1, further comprising additional brackets receiving screws mounted in an upper one of the exterior channels for mounting the protective enclosure from a roof or ceiling surface.

9. The protective enclosure recited in claim 8, wherein the additional brackets each have an elongated hole to allow rotation of the enclosure with respect to the brackets thereby to enable angular mounting of the unit.

10. The protective enclosure recited in claim 1, further comprising an illumination device powered by electrical power and illuminated and visible from outside the enclosure even when a video camera is not contained within the enclosure.

11. The protective enclosure recited in claim 10, wherein the illumination device comprises a light-emitting diode disposed on said front door.

12. The protective enclosure recited in claim 1, wherein the heads of the screws receivable in the exterior channels are square to prevent turning and the screws engage nuts having anti-theft profiles for securing the protective enclosure to the angle-shaped mounting brackets.

13. The protective enclosure recited in claim 1, wherein the front door includes a locking device.

14. The protective enclosure recited in claim 1, wherein the light transmissive member comprises a one-way light transmissive member allowing a video camera disposed on the mounting plate to see out but preventing someone from seeing into the enclosure from outside.

15. The protective enclosure recited in claim 1, wherein a video camera is attachable to the mounting plate by a screw receivable through a hole in the mounting plate and engageable with a tripod screw hole of the video camera.

16. The protective enclosure recited in claim 1, wherein the mounting plate comprises at least one finger formed out of the plane of the mounting plate and engageable with an upper or lower surface of an interior channel for holding the mounting plate securely in the enclosure without vibration with respect to the enclosure.

17. The protective enclosure recited in claim 16, wherein there are four fingers in the mounting plate, one located near each corner for engagement with an upper or lower surface of an interior channel.

18. The protective enclosure recited in claim 1, wherein the enclosure is adapted to be mounted in a vehicle, and further comprising a voltage conversion circuit for converting a voltage from a vehicle power source to a voltage required by the video camera.

19. The protective enclosure recited in claim 18, wherein the voltage conversion circuit is disposed on a circuit board provided in a housing, the housing being adapted to mount removably to a video camera in a position conventionally provided for disposition of a battery pack for the video camera, the circuit board having contact means thereon for engaging with electrical connections provided on the video camera for normally engaging with electrical connections of the battery pack.

20. The protective enclosure recited in claim 18, further comprising a controller circuit, the controller circuit providing at least one instruction for a video camera, the controller circuit being coupled to a control input of the video camera for providing the instruction thereto, the controller circuit being activated when power is applied to the video camera.

21. The protective enclosure recited in claim 20, wherein the instruction instructs a video camera to begin recording.

22. The protective enclosure recited in claim 21, wherein the video camera comprises a camera-recorder, and the instruction instructs the video camera to begin recording.

23. The protective enclosure recited in claim 20, further comprising a timer circuit disposed in series with the power source and the voltage conversion circuit for providing power to the video camera during a preselected time interval.

24. The protective enclosure recited in claim 23, wherein the timer circuit is disposed below said mounting plate.

25. The protective enclosure recited in claim 23, further comprising a dedicated power source for the timer circuit.

26. The protective enclosure recited in claim 25, wherein the dedicated power source is adapted to be charged whenever power is applied to the timer circuit.

27. The protective enclosure recited in claim 20, wherein the controller circuit and the voltage conversion circuit are disposed on a circuit board provided in a housing, the housing being adapted to mount removably to the video camera in a position conventionally provided for disposition of a battery pack for the video camera, the circuit board having contact means thereon for engaging with electrical connections provided on the video camera for normally engaging with electrical connections of the battery pack.

28. The protective enclosure recited in claim 1, wherein the electrical connections comprise a quick-releasable jack and plug, one of the jack and plug mounted on the mounting plate and the other of the jack and plug disposed on a surface of the enclosure, whereby when the mounting plate is slid into the enclosure, the jack and plug mate to provide electrical power to the video camera.

29. The protective enclosure recited in claim 28, further comprising an extension cord connected in parallel to the power source with one of said jack and plug disposed on the surface of the enclosure, for optionally providing electrical power to the video camera when the video camera is removed from the enclosure.

30. The protective enclosure recited in claim 1, wherein the interior channels are disposed on opposed inner surfaces of the enclosure so that the mounting plate is disposed substantially horizontally.

* * * * *